Dec. 4, 1951 — J. F. ROBB — 2,577,433
MACHINE FOR COATING CONFECTION BODIES
Filed March 31, 1949 — 2 SHEETS—SHEET 1

INVENTOR.
John F. Robb
BY Robb & Robb,
By John W. Robb, Attorneys

Dec. 4, 1951 J. F. ROBB 2,577,433
MACHINE FOR COATING CONFECTION BODIES
Filed March 31, 1949 2 SHEETS—SHEET 2
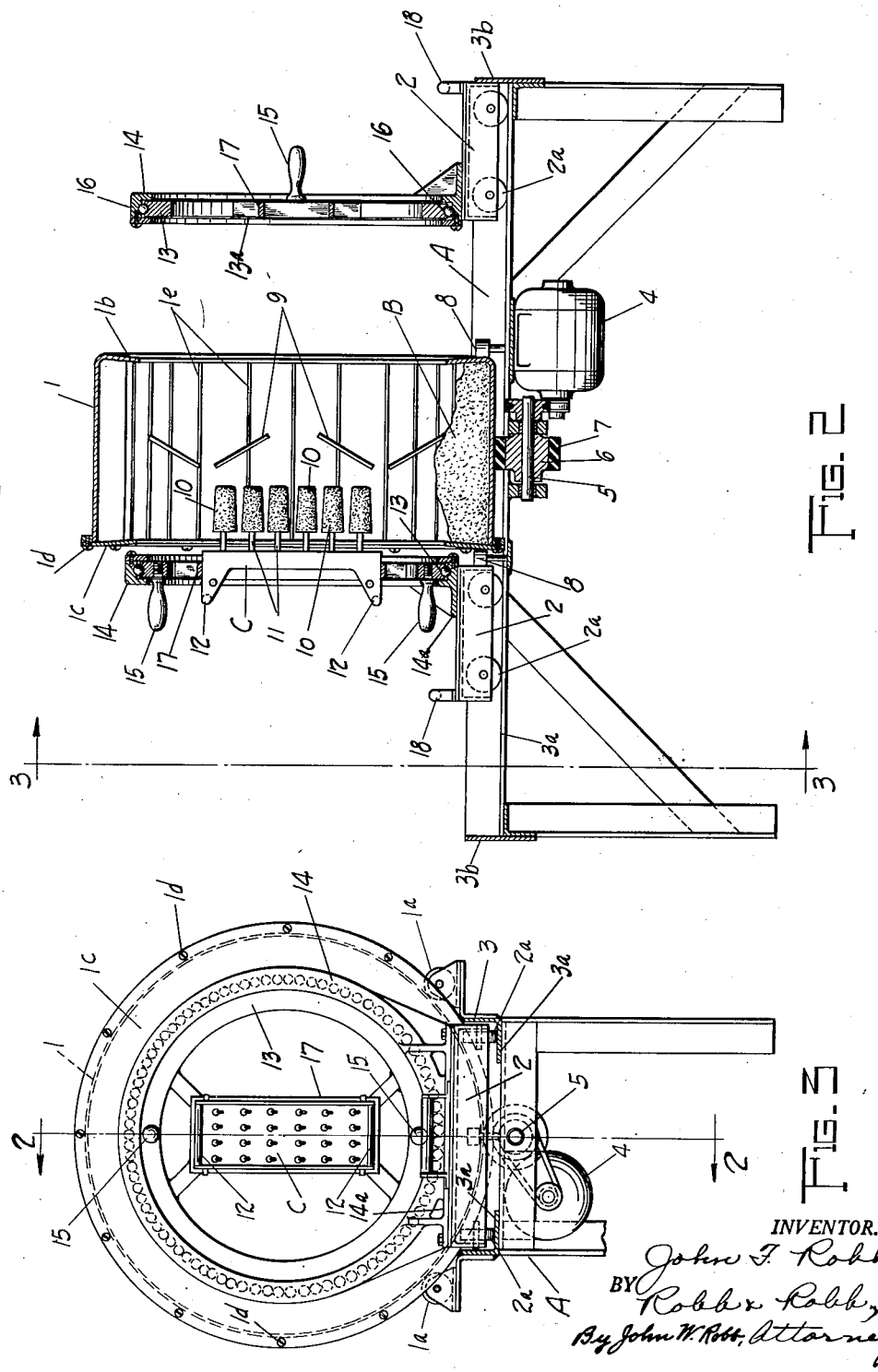

Patented Dec. 4, 1951

2,577,433

UNITED STATES PATENT OFFICE 2,577,433

MACHINE FOR COATING CONFECTION BODIES

John F. Robb, Cleveland Heights, Ohio, assignor to Good Humor Corporation, Brooklyn, N. Y., a corporation Application March 31, 1949, Serial No. 84,712

16 Claims. (Cl. 107—1)

This invention has for its object to provide an improved confection coating machine of the type comprising a drum continuously rotating about a horizontal axis, equipped with blades or flights on its inner periphery to pick up and spill downward the coating material placed therein, and supporting means for the confections separate from the drum for holding the confections during the coating operation.

The machine of this invention is designed preferably for use in coating stick impaled, or carried, ice cream confections to facilitate the coating of the ice cream confection bodies with granular matter such as ground nut meats, cocoanut, or the like. The said frozen confection bodies are usually dipped in an adhesive dip just prior to being placed in the path of the gravitating coating material handled by the machine, whereby the said material will adhere to the outer surfaces of the bodies and become united thereto before being placed in wrappers and stored for sale.

The principal objects of this invention are to so design a machine of the class mentioned that the support or carrier for the confection bodies may be rotated independently of and at higher speed than, the drum while holding the said bodies inside the drum for the coating action; to provide a drum having opposite end openings through which the confection bodies may be introduced into the drum by movement of carriers supporting the confections, to enable coating of two lots of the bodies simultaneously; to employ manual or other control means for rotating the confection bodies being coated within the drum, while supported by the rotatable carriers availed of, thus facilitating varying the time and speed of the rotation of the carriers and bodies thereon, according to the requirements for different kinds of coating materials that are used in producing frozen confections of the class referred to; to provide actuating means for shifting the rotatable carrier means toward and from the drum, to carry the confection bodies into and out of the drum, to facilitate presenting the surfaces of the confection bodies to the down-spilling stream of coating material in the drum, and withdrawal of the bodies from the drum; to utilize instrumentalities whereby to enable two operators to supply separate batches of confections to the single drum of the machine as fast as each coating operation of the machine is completed; to provide special deflecting devices in the drum to effectively apply the coating materials to the inner ends of the confection bodies as they are held on and turned by the rotative carriers located at opposite open ends of the drum; to provide for operation of the drum continuously during all coating operation of the machine and thus increase the efficiency of the machine; and, generally, to provide other detail features of construction usefully advantageous in a machine of the class to which this invention pertains.

For a full understanding of a machine embodying the essential features of my present invention, reference is to be had to the following detail description in conjunction with the accompanying drawings, and in the latter:

Figure 1 is a perspective view of a machine embodying the essential features of the invention.

Figure 2 is a vertical longitudinal sectional view taken through the machine and illustrating a confection holder supporting stick confections with the confection bodies within the drum of the machine at one side thereof and carried by one of the rotating holders or carrier frames, the other carrier frame being spaced from the drum and ready to receive a confection holder and its supported stick confections for advancing toward the adjacent side of the drum in the operation of introducing the latter confections into the drum at the same or a different time from the time of introduction of the confections that are shown already in place in the drum.

Figure 3 is an end view of the machine, certain parts of the stand broken away and looking toward the machine from the left as viewed in Figure 2.

Figure 1:
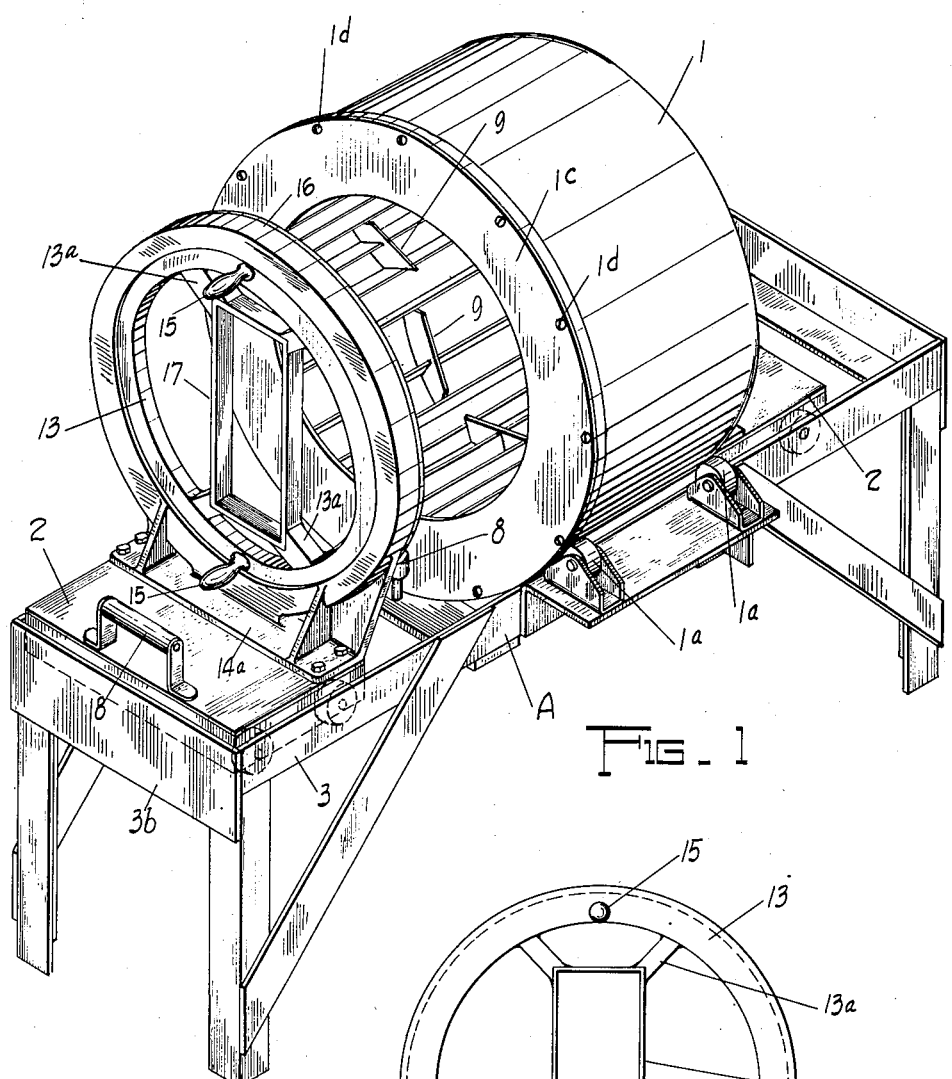
Figure 4:
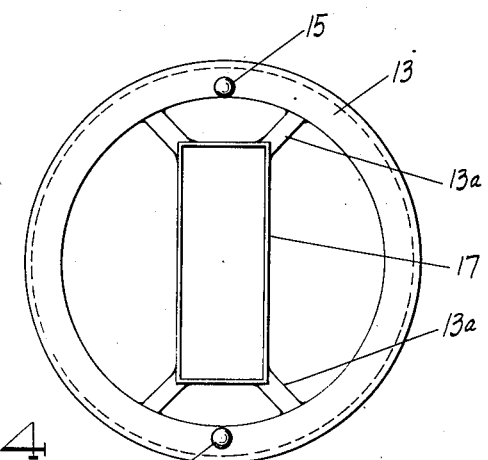
Figure 4 is a view in elevation of one of the rotatable carrier frames for the confection holders.

Referring now to the construction of the invention in a preferred embodiment thereof as shown in the drawings, it will be noted that the coating machine comprises a stand A which may be a structure fabricated from metal angles and plates, the sides 3 of the frame consisting of angle bars or rails, the horizontal flanges of which provide tracks 3a on which are mounted and supported near the end of the frame a pair of roller equipped, and therefore slidable, carriages designated 2. These rollers of the carriages 2 are designated 2a and move along the track flanges 3a when the carriages 2 are shifted longitudinally of the frame A. The movement of the carriages 2 toward the opposite ends of the frame is limited by end plates 3b adjacent to the upper extremities and outer side portions of the end legs of the frame A.

Supported on the frame A by means of suitable supporting rollers is a coating drum 1 of circular form the said drum being adapted to revolve on the said rollers as a supporting means, the rollers being designated 1a. The drum is made up largely of a body having the integral end portion 1b formed with a central opening of relatively large area, the opposite end of the drum 1 being designated 1c and being attached to the body of the drum by means of bolts or like fastenings 1d so that said end may be detached whenever desired for the purpose of facilitating the thorough cleansing of the drum at periodic intervals when this matter is usually attended to in the employment of the machine under practical conditions of service. The end 1c of the drum has a large central opening like that of the end 1b.

The coating material with which the confection bodies are to be processed in the use of the machine is carried by the drum in the lower portion thereof as shown at B in Figure 2.

During revolution of the drum 1 the coating material is elevated and spilled downwardly toward the axis of the drum by means of blades 1e attached to the inner periphery of the drum and extending radially short distances from such periphery in the direction of the drum axis.

Any suitable power mechanism may be employed for driving the drum 1 for effecting its proper constant rotation. In the drawings this means is illustrated as consisting of a motor 4 operatively connected to a driven shaft 5 which carries a driving wheel 6 having a peripheral surface of friction material 7 engaging the middle outer portion of the drum at its periphery so as to turn the drum when the motor is put into operation, in an obvious manner. The drum may be driven by a belt drive from the shaft 5, if desired, or it may be gear actuated if such construction is availed of, much after the ordinary manner of driving the drum in concrete mixing machines.

For preventing axial displacement of the drum in its position on stand A during rotation of the drum or when it is stationary, I provide rollers 8 engaging the opposite end members 1b and 1c of the drum and supported by vertical spindles on the top of the stand A.

Within the drum 1 and in a plane about radially central of the ends of the drum are located oppositely inclined material deflecting blades 9 which, as the drum is rotated tend to pitch the material elevated and spilled downwardly by the blades 1e, toward the opposite open ends of the drum, for a purpose to be hereinafter referred to.

Stick confections such as designed to be coated by the machine of this invention are illustrated in Figure 2 as comprising confection bodies 10 carried by the handles or sticks 11; and these confections are adapted to be supported, with the confection bodies 10 within the drum, by means of a conventional holder known in the prior art and of the construction depicted by Anderson Patent No. 2,232,196, of February 18, 1941. The holder for the confection is designated at C generally and has handles 12 at its opposite ends to be grasped in the handling of the holder when moved from one place to another. Any suitable clamping holder may be used, however.

In the carrying out of the present invention each of the carriages 2 has mounted thereon a rotatable supporting frame 13 the outer portion of which is circular, or ring-like, and mounted to rotate in a ring-like bearing frame 14, handles 15 projecting outwardly from each of the supporting or carrier frames 13 for effecting manual rotation of the associated frame 13. Interposed between the guide ring 14 and the carrier frame 13, there may be provided rollers or ball bearings, ball bearings 16 being shown. The guide ring 14 is welded or otherwise attached at its lower end to the inner end portion of the associated carriage 2, the construction illustrated being one in which the lower end of each of the members 13 is formed with a horizontal bracket 14a that is bolted directly to the inner end of the adjacent carriage 2 which supports the said ring 14.

Reverting to the carrier frame 13 for the confection holder C, it is notable that this frame is equipped with spoke-like members 13a extending radially from the body of the frame designated 13 and carrying at their inner ends the approximately rectangular supporting frame 17 which is dimensioned so as to receive therein snugly the confection holder C when the latter is mounted on the carrier frame. Obviously, the confection holder C supplied with a plurality of confections gripped or clamped thereby in the manner of use of the holder shown in the Anderson patent previously mentioned, may be seated in the frame member 17 of the carrier frame 13 and the said frame 13 along with the parts 13a, 17, and the holder C may be readily rotated by the operator grasping one of the handles 15 and imparting a rotating movement to said parts in relation to the said guide or ring member 14, which of course is stationary on its associated carriage 2.

At the outer end of each of the carriages 2 I provide a handle 18 which may be grasped by an operator in order to move the carriage 2 toward the drum 1 at the adjacent side of the drum, and to pull the carriage 2 away from the drum, at will.

With the foregoing details of construction of my machine in mind, the operation thereof will become evident in the light of the following description.

The drum 1 is started into operation at the commencement of period of the use of the machine, and it is contemplated that it will be maintained in rotation during the entire operation of coating the confections which are from time to time placed in position for the coating operation. As seen in Figure 2, the left hand carrier frame 13 has had the holder C supporting clamped thereto a plurality of confections 10, emplaced in the frame portion 17 of the said member 13, and thereupon the carriage 2 has been advanced toward the adjacent end of the drum 1 until the confection bodies 10 of the confection units are disposed within the drum in the path of the coating material which is raised upwardly by the blades 1e of the drum and spilled over on top of the confections. During the coating operation it is contemplated that the confection units shall be rotated independently of the rotation of the drum itself, and preferably at a greater speed than the rotation of the drum, and with this in mind, as soon as the confection units are in position within the drum, as seen in Figure 2 at the left side of the drum, the ring or frame 13 will be rotated by actuation from one of the handles 15.

By reason of the construction of my rotative carrier frame 13, it is possible to rotate the confections in a direction opposite to the direction of rotation of the drum so that the confections meet the down-spilling coating material precipitated from the blades 1e by being advanced toward said material.

It is apparent from the construction of my machine that at the same time that the confections 10 are being coated, referring to those that are in the drum, a second series of confections, similarly supported upon the right hand rotative carrier frame 13 may be introduced into the drum 1 and coated. Thus, by the use of a single drum, two coating operations may be carried on at one time, increasing the capacity of the machine incident to the foregoing advantage. Or, if desired, the coating operation may be performed in respect to the series of confections as disposed in Figure 2 illustration and as these confections are being removed, the right hand carrier frame 13 may be advanced toward the adjacent side of the drum and its supported bodies 10 inserted for the coating action.

As the drum rotates, the blades 9 previously referred to tend to deflect the down-falling coating material running off the blades 1e into opposite directions of movement, namely toward the openings at the opposite ends of the drum, and in this manner the coating material is effectively applied to the inner end portions of the confections 10.

A preferred mode of operation of the invention may reside also in the simultaneous grasping of the handle 18 of each carriage 2 and pulling said carriage outwardly away from the drum while the carrier 13 is simultaneously turning while supported by said carriage, thereby to prevent the accumulation on the confection bodies 10 of the coating material.

The drum 1 being always in continuous operation speeds up the coating method of the invention in an obvious manner since all that is necessary to be done is to position the rotative carrier frame 13 alongside an end of the drum with the holder C mounted thereon supporting the various confections with the bodies 10 within the drum 1, and after giving the frame or carrier 13 a quick rotative movement for several revolutions, the confections may be withdrawn from the drum with the holder C very easily, completing the coating action.

The ends 1b and 1c of the drum 1 incline inwardly to deflect the coating material in the direction of the middle of the drum.

The drive from the motor 4 to the shaft 5 is shown as a belt drive. A switch, not shown, is used to supply and cut off current to the motor 4.

Having thus described my invention, what I claim as new and desire to secure by Letters Patent of the United States is:

1. In a confection coating machine, a support, a coating material holding drum mounted to rotate about a horizontal axis on the support, and having an open end portion, blades on the drum interiorly thereof and rotatable therewith to pick up and spill coating material downward toward the axis of the drum, a carrier at the open end of the drum, means supporting said carrier for rotation independently of the drum, said carrier having means for supporting confections to be coated within the zone of the spilling of said material, and means to rotate the carrier independently of the drum.

2. In a confection coating machine, a support, a coating material holding drum mounted to rotate about a horizontal axis on the support, and having an open end portion, blades on the drum interiorly thereof and rotatable therewith to pick up and spill coating material downward toward the axis of the drum, a rotatable carrier on the support at the open end of the drum, a holder for confection bodies mounted on said carrier, and means to turn the carrier and holder in a direction opposite to the direction of rotation of the drum.

3. A machine as claimed in claim 1, combined with a carriage movable toward and from the open end of the drum and on which the rotatable carrier is mounted.

4. A machine as claimed in claim 1, combined with a carriage shiftable on said support to move toward and from the open end of the drum, and means connecting the rotating carrier to said carriage.

5. A machine as claimed in claim 1, in which the confection supporting means is removably connected to the carrier, and the means to rotate the carrier comprises a manually operable member.

6. In a confection coating machine, a support, a coating material holding drum mounted to rotate about a horizontal axis in the support, and having confection introducing openings in its opposite ends, blades on the drum interiorly thereof and rotatable therewith to pick up and spill coating material downward toward the axis of the drum, carriers on the support adjacent to the openings in the opposite ends of the drum, confection holding means on said carriers, and means for moving the carriers to shift the confection holding means thereon into and out of the path of flow of the down spilling coating material in the drum and independently of the drum.

7. In a confection coating machine, a support, a coating material holding drum mounted to rotate about a horizontal axis in the support, and having confection introducing openings in its opposite ends, blades on the drum interiorly thereof and rotatable therewith to pick up and spill coating material downward toward the axis of the drum, carriers on the support adjacent to the openings in the opposite ends of the drum, confection holding means on said carriers, and means for rotating the carriers to shift the confection holding means thereon in a direction opposite to that of the down-spilling coating material in the drum.

8. A machine as claimed in claim 1, in which the carrier comprises a carrier frame and the supporting means for the carrier includes guide means for said carrier frame, and anti-friction means between the carrier frame and the guide means.

9. A machine as claimed in claim 1, in which the carrier comprises a carrier frame and the supporting means for the carrier includes guide means for said carrier frame, and anti-friction means between the carrier frame and the guide means, and in which the carrier rotating means is a handle on the carrier frame.

10. In a confection coating machine, a support, a coating material holding drum mounted to rotate about a horizontal axis on the support, and having its opposite ends provided with openings, blades on the drum interiorly thereof and rotatable therewith to pick up and spill coating material downward toward the axis of the drum, guide members adjacent to said ends of the drum and spaced therefrom, a carrier frame mounted to rotate in each guide member, a confection holder removably mounted in each carrier frame, and means to rotate the carrier frames and the holders supported thereby.

11. A machine as claimed in claim 10, combined with a carriage mounted on the support at each end of the drum and shiftable toward and from the drum, and means attaching each guide member to the carriage at the adjacent end of the drum.

12. A machine as claimed in claim 10, combined with deflecting members on the drum at the portion thereof carrying said blades, said deflecting members extending in opposite directions toward the ends of the drum and generally disposed along the plane of the middle portion of the drum radially of the axis thereof.

13. In a machine for coating confections, in combination, a support, means on the support to elevate and spill coating material in a predetermined path of movement, and a confection carrier rotatable independently of said elevating means, and means on said carrier for supporting confections in the path of spilling movement of said coating material.

14. A machine as claimed in claim 13, in which the last means include a frame on the carrier for receiving a detachable confection holder.

15. In a machine for coating confections, in combination, a support, means on the support to elevate and spill coating material in a predetermined path of movement, a confection carrier rotatable independently of said elevating means, supporting means on said carrier for supporting a confection holder, and a confection holder mounted in said supporting means for supporting confections in the path of spilling movement of said coating material.

16. A machine as claimed in claim 15, in which the said confection holder is detachably connected with said supporting means.

JOHN F. ROBB.

REFERENCES CITED

The following references are of record in the file of this patent:

UNITED STATES PATENTS

| Number | Name | Date |
| --- | --- | --- |
| 300,037 | Baker | June 10, 1884 |
| 750,076 | Annen | Jan. 19, 1904 |
| 2,335,118 | Hauser et al. | Nov. 23, 1943 |
| 2,450,661 | Herrmann | Oct. 5, 1948 |